United States Patent Office 3,185,190
Patented May 25, 1965

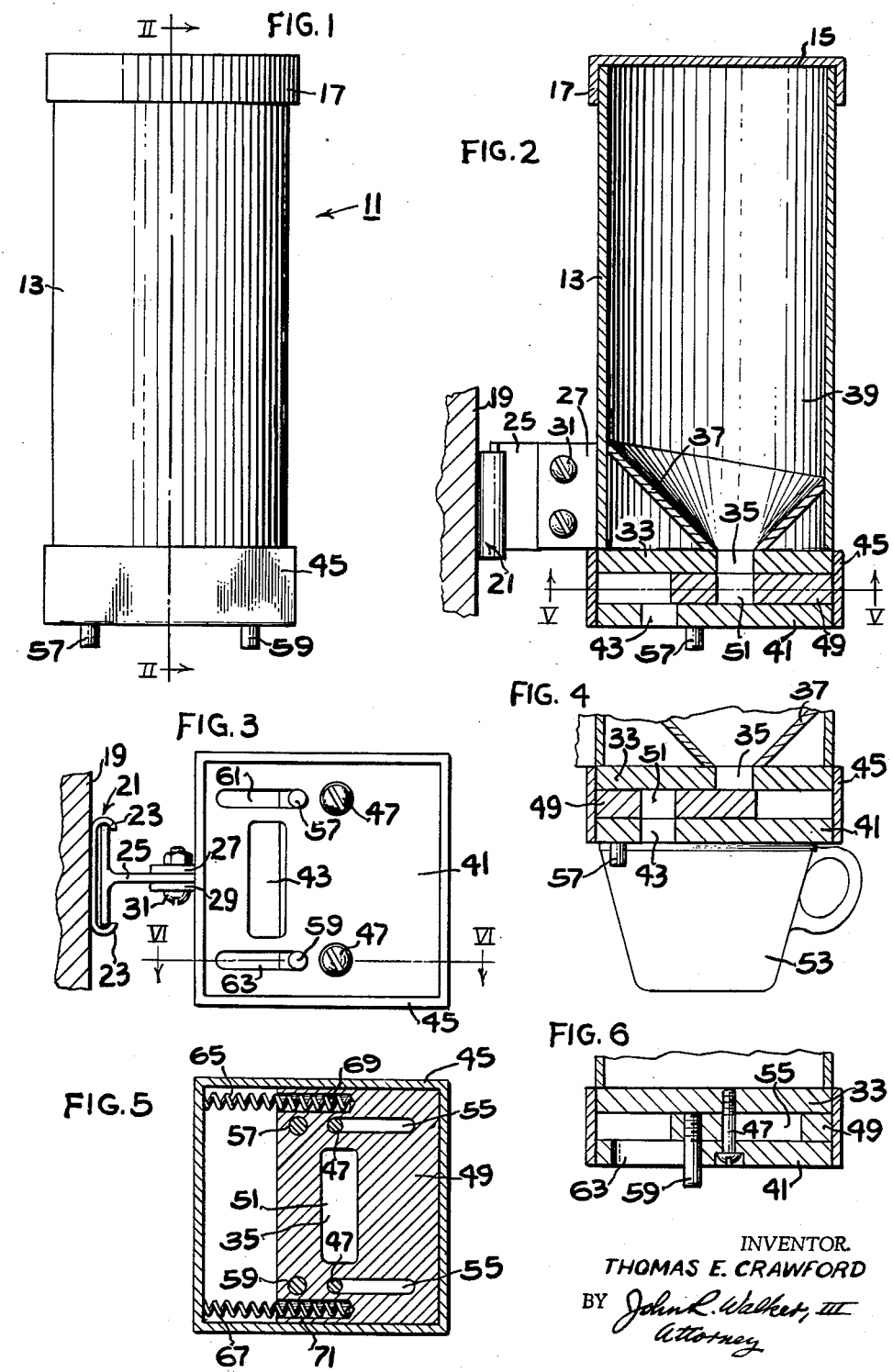

3,185,190
DISPENSER FOR INSTANT COFFEE AND THE LIKE
Thomas E. Crawford, 5205 Edenshire, Memphis, Tenn.
Filed Oct. 12, 1961, Ser. No. 144,691
5 Claims. (Cl. 141—369)

This invention relates to an improved device of the type adapted to dispense a measured quantity of granular material such as instant coffee, tea, or the like.

There have been other devices of the above mentioned general type, but these prior devices required some manipulation of a lever, knob or the like by one hand while the cup or other container was being held beneath the device with the other hand. On many occasions, a person, when desiring to measure coffee or the like into a cup, is carrying something else in his other hand, for example, another cup, and it makes it impossible to measure the coffee without having to put the other cup down. This is time consuming and very bothersome, especially for a busy cook rushing to prepare a dinner.

The present invention is directed towards overcoming the above mentioned and other disadvantages of previous dispensing devices.

Thus, one of the objects of the present invention is to provide a dispensing device for instant coffee or the like that is operable merely by pushing the cup or other container against a pair of depending pegs, which causes a predetermined measured amount (as for example, one teaspoonful) to fall into the cup each time it is pushed against the pegs.

A further object is to provide a dispensing device which eliminates the necessity of using one's hands with the exception of the one holding the cup or the like into which the material is to be dispensed.

A further object is to provide such a device that is simple in construction and economical to manufacture.

A further object is to provide such a device that is easily removed from its wall bracket for refilling, washing, etc.

A further object is generally to improve the design and construction of dispensing devices.

The means by which the foregoing and other objects of the present invention are accomplished and the manner of their accomplishment will be readily understood from the following specification upon reference to the accompanying drawings, in which:

FIG. 1 is a front elevational view of the device of the present invention.

FIG. 2 is a sectional view taken as on the line II—II of FIG. 1, with parts being shown in elevation for purposes of clarity.

FIG. 3 is a bottom view of the device shown in FIG. 2.

FIG. 4 is a view of a fragmentary portion of the device shown in FIG. 2 but showing the slide actuated to a dispensing position by a cup, and with the cup being shown in elevation.

FIG. 5 is a sectional view taken as on the line V—V of FIG. 2.

FIG. 6 is a fragmentary sectional view taken as on the line VI—VI of FIG. 3.

Referring now to the drawings in which the various parts are indicated by numerals, the dispensing device 11 of the present invention comprises a vertically disposed hollow cylindrical container 13 which is open at the top to provide an inlet 15 for introducing granular material as instant coffee or the like into the interior of the container. A suitable removable top closure 17 is provided for closing inlet 15 when coffee or the like is not being introduced into the container.

Suitable means is provided for removably supporting container 13 from a supporting surface as wall 19. This supporting means preferably comprises a bracket 21 fixedly attached to wall 19 by suitable means and which bracket has opposite inturned lips 23 along opposite side edges thereof adapted to removably receive a T-shaped member 25 which slides into bracket 21 from the top thereof and is arranged to wedge in place therein. T-shaped member 25 is secured to container 13 by suitable means as a pair of spaced plates 27, 29 fixedly attached to the container by suitable means and attached to the T-shaped member as by means of bolts 31 or the like.

Dispensing device 11 additionally includes a first bottom 33 fixedly attached over the lower end of container 13 and which bottom is provided with an aperture 35 vertically therethrough. A funnel 37 is fixedly mounted in container 13 and extends downwardly from adjacent the inside wall surface 39 of container 13 to aperture 35 for directing the instant coffee or the like from the container 13 down into the aperture.

A second bottom 41 is provided in dispensing device 11 and is spaced below first bottom 33. A hole 43, which is preferably substantially the same size and shape as aperture 35, is provided vertically through second bottom 41 but is offset from aperture 35. Second bottom 41 is fixedly attached to first bottom 33 as by means of a rectangular housing 45 extending around first bottom 33 and second bottom 41 and fixedly attached thereto. In addition, a pair of screws 47 interconnect first bottom 33 and second bottom 41.

A substantially rectangular block 49 is slidably disposed in the space between first bottom 33 and second bottom 41 for movement between a loading position, best shown in FIG. 2, and a dispensing position, best shown in FIG. 4. A passageway 51 of the size of a predetermined amount of instant coffee or the like, as for example, one teaspoonful, is provided vertically through block 49. Passageway 51 is preferably, though not necessarily, of substantially the same size and shape as aperture 35 and hole 43. When block 49 is in said loading position, it will be best seen in FIG. 2 that passageway 51 is substantially in alignment with aperture 35 so that a measured quantity of coffee or the like is adapted to move from container 13 through the aperture to the passageway for measuring a predetermined amount of instant coffee or the like. Also, it will best be seen in FIG. 4 that when block 49 is in said dispensing position, passageway 51 is in alignment with hole 43 so that the measured quantity of instant coffee or the like is adapted to be dispensed from passageway 51 through hole 43 to the receiving container as a cup 53 or the like, as will be more fully understood in the operation of the device 11 and the means for sliding block 49 hereinafter described.

A pair of pegs 57, 59 are fixedly attached to block 49 and depend respectively through slots 61, 63 provided in second bottom 41. Pegs 57, 59 are preferably fixedly secured to block 49, as above described, by means of threading the upper ends of the pegs and screwing them into threaded sockets in the block. Pegs 57, 59 extend below second bottom 41 for a substantial distance whereby the pegs are adapted to be engaged by cup 53. Slots 61, 63 are disposed on opposite sides of hold 43 and are of such a length that the portions of second bottom 41 which define the opposite ends of the slots provide the means for limiting movement of the block 49 to stop the block in said dispensing and loading positions when the pegs engage these portions of the second bottom.

Means is provided for normally urging block 49 into said loading position and this means preferably comprises a pair of springs 65, 67 which are respectively received in sockets 69, 71 provided in block 49. Springs 65, 67 extend between block 49 and housing 45, as best seen in FIG. 5.

In using the dispensing device 11 of the present invention, it will be understood that a container as cup 53 or the like is pushed laterally against pegs 57, 59 against the force of the springs 65, 67 to move block 49 from said loading position to said dispensing position so that a predetermined amount of instant coffee or the like is dropped down into the cup. If an additional measured amount is desired, then the cup is simply moved away from pegs 57, 59 to release block 49 which, under the influence of springs 65, 67, moves into said loading position to receive another quantity of instant coffee and then the cup is again moved against pegs 57, 59 in the above described manner to provide the measured amount. It will be understood from the above described operation that when passageway 51 is not in register with aperture 35, the downward flow of coffee or the like from container 13 will be blocked by the upper surface of block 49.

From the foregoing description it will be seen that a very convenient and handy dispensing device is provided which eliminates the necessity of using one's hands with the exception of the hand holding the cup in which the material is to be dispensed. In addition, it will be seen that the present invention provides means for quickly and easily dispensing the exact amount of coffee or the like desired. Also, the present invention provides a device that is simple in construction and economical to manufacture. Further, such a device is provided which is easily removed from its wall bracket for refilling, washing, etc.

Although the invention has been described and illustrated with respect to a preferred embodiment thereof, it is to be understood that it is not to be so limited since changes and modification may be made therein which are within the full intended scope of this invention as hereinafter claimed.

I claim:

1. A dispenser for granular material comprising a vertically disposed hollow container having an inside wall surface defining the interior of said container, said container having an inlet for introducing granular material into said interior of said container, said container including a first bottom having an aperture therethrough, said container including a second bottom spaced below said first bottom and having a hole therethrough offset from said aperture, a block slidably disposed between said first and second bottoms and provided therethrough with a passageway of the size of a predetermined amount of granular material, said block being positioned in a normal loading position wherein said passageway is in alignment with said aperture to permit a measured quantity of granular material to move from said aperture to said passageway for measuring a predetermined amount of granular material, a pair of pegs fixedly attached to said block and depending below said second bottom for movement by a cup pushed thereagainst, said block being movable in a first direction in response to movement of said pegs by a cup, means for limiting movement in said first direction of said block to stop said block in a dispensing position with said passageway in alignment with said hole for dispensing a measured amount of granular material from said passageway through said hole, when said block is in said dispensing position said pegs being so positioned that a cup being pushed thereagainst is disposed beneath said hole whereby a measured amount of granular material dispensed through said hole is adapted to fall into the cup.

2. A dispenser for granular material comprising a vertically disposed hollow container having an inside wall surface defining the interior of said container, said container having an inlet for introducing granular material into said interior of said container, said container including a first bottom having an aperture therethrough, said container including a second bottom spaced below said first bottom and having a hole therethrough offset from said aperture, a block slidably disposed between said first and second bottoms and provided therethrough with a passageway of the size of a predetermined amount of granular material, spring means contacting said block and urging said block into a normal loading position wherein said passageway is in alignment with said aperture to permit a measured quantity of granular material to move from said aperture to said passageway for measuring a predetermined amount of granular material, a pair of pegs fixedly attached to said block and depending below said second bottom for movement by a cup pushed thereagainst, said block being movable in a first direction against said spring means in response to movement of said pegs by a cup, means for limiting movement in said first direction of said block to stop said block in a dispensing position with said passageway in alignment with said hole for dispensing a measured amount of granular material from said passageway through said hole, when said block is in said dispensing position said pegs being so positioned that a cup being pushed thereagainst is disposed beneath said hole whereby a measured amount of granular material dispensed through said hole is adapted to fall into the cup, and said block when released from said dispensing position by withdrawal of a cup from said pegs being movable in response to said spring means back to said loading position for measuring another quantity of granular material.

3. A dispenser for granular material comprising a vertically disposed hollow container having an inside wall surface defining the interior of said container, said container having an inlet for introducing granular material into said interior of said container, said container including a first bottom havng an aperture therethrough, said container including a second bottom spaced below said first bottom and having a hole therethrough offset from said aperture, a funnel in said container leading downwardly from adjacent said inside walls of said container to said aperture, a block slidably disposed between said first and second bottoms and provided therethrough with a passageway of the size of a predetermined amount of granular material, spring means contacting said block and urging said block into a normal loading position wherein said passageway is in alignment with said aperture to permit a measured quantity of granular material to move from said aperture to said passageway for measuring a predetermined amount of granular material, said second bottom being provided with a pair of slots, a pair of pegs fixedly attached to said block and depending respectively through said slots below said second bottom for movement by a cup pushed thereagainst, said block being movable in a first direction against said spring means in response to movement of said pegs by a cup, means for limiting movement in said first direction of said block to stop said block in a dispensing position with said passageway in alignment with said hole for dispensing a measured amount of granular material from said passageway through said hole, when said block is in said dispensing position said pegs being so positioned that a cup being pushed thereagainst is disposed beneath said hole whereby a measured amount of granular material dispensed through said hole is adapted to fall into the cup, and said block when released from said dispensing position by withdrawal of a cup from said pegs being movable in response to said spring means back to said loading position for measuring another quantity of granular material.

4. A dispenser for dispensing granular material into a cup or the like comprising a container having a hollow interior, means for removably mounting said container on a wall or the like, a first substantially flat and horizontally extending bottom included in said container and having an aperture opening into said hollow interior, a second bottom subjacently and fixedly attached to said first bottom and having a hole offset horizontally from said aperture in said first bottom, a block slidably disposed between said first and second bottoms having a passageway opening vertically through said block, means interconnecting said block and said first bottom for rectilinearly guiding the sliding movement of said block between a first and a second position, said block when in said first position being disposed with said passageway in vertical alignment with said aperture in said first bottom and with said block in said second position being disposed with said passageway in vertical alignment with said hole in said second bottom, and actuating means coupled to said block for operable movement of said block to and from said first and second positions, said actuating means comprising a spring for yieldably holding said block in said first position and abutment means projecting downwardly from said block for abutttingly engaging the cup and operably moving said block to said second position.

5. A dispenser for dispensing granular material into a cup or the like comprising a container having a hollow interior, means for removably mounting said container on a wall or the like, a first substantially flat and horizontally extending bottom included in said container and having an aperture opening into said hollow interior, a second bottom subjacently and fixedly attached to said first bottom and having a hole offset horizontally from said aperture in said first bottom, a block slidably disposed between said first and second bottoms having a passageway opening vertically through said block, means interconnecting said block and said first bottom for rectilinearly guiding the sliding movement of said block between a first and a second position, said block when in said first position being disposed with said passageway in vertical alignment with said aperture in said first bottom and with said block in said second position being disposed with said passageway in vertical alignment with said hole in said second bottom and actuating means coupled to said block for operable movement of said block to and from said first and second positions, said actuating means comprising a spring for yieldably holding said block in said first position and abutment means projecting downwardly from said block for abuttingly engaging the cup and operably moving said block to said second position, said abutment means comprising two spaced pegs.

References Cited by the Examiner
UNITED STATES PATENTS

| | | | |
|---|---|---|---|
| 2,766,908 | 10/56 | Wheeler | 141—360 XR |
| 2,775,989 | 1/57 | Jensen | 141—360 |
| 2,849,035 | 8/58 | Morey | 141—360 |
| 3,097,765 | 7/63 | Newton | 222—336 XR |

FOREIGN PATENTS

| | | |
|---|---|---|
| 63,331 | 7/27 | Sweden. |

LAVERNE D. GEIGER, *Primary Examiner.*

RAPHAEL M. LUPO, *Examiner.*